Patented Nov. 17, 1931

1,832,375

UNITED STATES PATENT OFFICE

ERICH JOSE FRANCK, OF TUCUMAN, ARGENTINA

PROCESS FOR THE PRODUCTION OF CELLULOSE AND HYDROCARBONS FROM SUGAR CANE SPROUTS AND REFUSE AND BURNT AND FROZEN CANE

No Drawing. Application filed January 8, 1929, Serial No. 331,158, and in Argentina July 6, 1928.

The present invention relates to a process for the production of cellulose and carbohydrates from sugar cane sprouts and refuse material, such as burnt and frozen cane, with the aid of chemical processes in combination with the development of gases from various chemical substances.

Under these conditions, not only the cellulose obtained is of a quality higher than that of the cellulose produced in accordance with my Argentina Letters Patent No. 26,073, but the present process for the production thereof is of a much shorter length.

It is generally known that for a long time experiments have been made in order to produce cellulose from the sugar cane residues, or "bagasse", but up to the present no positive results have been obtained in producing cellulose from sprouts, refuse material and burnt or frozen cane, nor have experiments made in this connection been successful.

The present invention is of still greater importance on account of the fact that the materials under consideration have no commercial value but rather constitute waste products in the sugar industry and, further, such materials can be found in unlimited abundance in the country.

After prolonged studies and experiments directed to the observation of cellulose-formation, I have been able to produce cellulose and carbohydrates from the above mentioned materials with the aid of a very simple and economical method.

My experiments have shown that the same result may be obtained with sprouts and refuse material as well as with burnt and frozen cane.

According to the material employed, my practical experiments have shown that the yield of cellulose may reach from 70-80%, and that of carbohydrates from 8 to 10%.

The cellulose produced from the said raw materials is of matchless purity and may be employed to advantage in the manufacture of all kinds of paper.

With the experience gained through the numerous experiments effected, my process principally consists in the conservation of the cellulose fibre and of the carbohydrates already existing or present in the aforementioned raw materials. This object is attained by means of the extraction, without the employment of heat, of the fermentable products such as, inosite, ramose, levulose and, also, the viscous substances and lignin.

It should be mentioned that according to the present invention no acids are employed, as in the case of my prior Letters Patent, but only salts which preserve the fibres and the raw material necessary for the obtention of cellulose and carbohydrates. Simultaneously, the process according to the present invention provides for the recovery of the same salts which, thereafter, may be used in further operations for the extraction of cellulose.

The present invention, for the production of cellulose and carbohydrates from sugar cane sprouts and refuse material, or from burnt or frozen sugar cane, comprises four different chemical processes.

*First process*

The extraction, without the employment of heat, of the fermentable products, employing salts such as sodium or calcium sulphide; also in combination with sodium carbonate or caustic soda. Good results have been obtained with a duration of from four to twenty-four hours, extracting the fibre which is adequate for its being placed immediately within an autoclave. The remainder of the liquid containing fermentable products may be used for a further operation. In case such liquid should be of sufficient density, it may be used for the dry distillation of the aforementioned carbohydrates.

*Second process*

The former paste, passing through the bath as indicated in the first process, is boiled in an open autoclave provided with a cooler, adding a salt lye in combination with common raw sulphate containing salts such as sodium chloride, sodium carbonate, magnesium chloride and magnesium sulphate. In accordance with the combination, the lye has a density of 3–4 Baumé. Closing up the autoclave, the boiling is then conducted until reaching a temperature of 100° C. during one hour or one hour and a half. Thereafter, a substance is added which, in combination with the products according to the aforementioned mixture of salts, will be able to develop gases. Such substance may be chlorine in the form of sulphur monochloride, sulphur dichloride or tetrachloride. Then, the boiling is continued during one or two hours, during which time methylic alcohol is distilled out absorbing the gases developed in the meantime. The refrigerator is shut off, and the operation is continued for an additional period of time under a pressure of from 1 to 2 atmospheres. Through the said additions and the chemical combinations produced resulting in the development of gases, a white cellulose having long and strong fibers is obtained, which may be used for the manufacture of all kinds of paper, from ordinary wrapping paper to high class writing paper, according to the further treatment adopted.

Third process

This process merely consists in bleaching the cellulose within a bath composed of a dilution of electrolytic chlorine, in a proportion of 12 grams for each liter of water.

Fourth process

The liquids resulting from the manufacture of cellulose are evaporated in a vacuum evaporating apparatus, thereafter they are dried in an oven with direct heat from whence they are passed into a dry distillator (of the kind used for distillation of wood), the temperature being raised progressively up to 350° C., the final distillate being acetone containing methylic alcohol, and tar which contains pyridine, pyrrole and creosote. The finally resulting material is dissolved in water, there resulting again the necessary products for the manufacture of cellulose.

Mode of preparing the cellulose

A mixture is made of:
100 kgs. of cane sprouts or refuse material, etc.
800 ltrs. of water
2 kgs. calcium sulphide
2 kgs. sodium carbonate, or any other of the aforementioned salts the mixture being stirred during from 4 to 24 hours.

To 400 liters of water there is added 1½ kgs. of saltpetre, 1½ kgs. of sodium carbonate and 4 kgs. of sodium chloride; this solution is added to the vegetable fibers and the mixture so produced is stirred for one or two hours until reaching a temperature of 100° C.

Thereafter, addition is made of 4 kgs. of sodium or calcium sulphite, or 3 kgs. of ammonium sulphite, the process being carried forward in accordance with the previous statements.

Mode of obtaining the carbohydrates

Distilling the liquids resulting from the manufacture of cellulose, within an apparatus up to a temperature of 350° C., the so obtained distillate is formed of the carbohydrates.

I claim as my invention:

1. A process for manufacturing cellulose and for obtaining carbohydrates from sprouts and refuse of sugar cane, and from burnt and frozen cane, which comprises treating the raw material with a chemical product; and treating the material with a different chemical product which, in combination with the first chemical product previously used, develops gases which are only slightly soluble in the medium wherein the treatment is being carried out.

2. A process for manufacturing cellulose and for obtaining carbonhydrates from sprouts and refuse of sugar cane, and from burnt and frozen sugar cane, which comprises treating the raw material with calcium sulphide; and treating the material with a sulphide and chloride which, in combination with the calcium sulphide, develops gases.

3. A process for manufacturing cellulose and for obtaining carbonhydrates from sprouts and refuse of sugar cane, and from burnt and frozen cane, which comprises treating the raw material with a chemical product; treating the material with a different chemical product which, in combination with the first chemical product previously used, develops gases which are practically insoluble in the media involved; and evaporating the treated liquids to obtain the carbohydrates.

4. A process for manufacturing cellulose and for obtaining carbonhydrates from sprouts and refuse of sugar cane, and from burnt and frozen sugar, which comprises treating the raw material with calcium sulphide; treating the material with a sulphide and chloride which, in combination with the calcium sulphide, develops hydrogen sulphide-containing gases; and evaporating the treated liquids to obtain the carbohydrates.

In testimony whereof I affix my signature.

ERICH JOSE FRANCK.